United States Patent [19]
Yasumoto et al.

[11] Patent Number: 5,470,670
[45] Date of Patent: Nov. 28, 1995

[54] FUEL CELL

[75] Inventors: Eiichi Yasumoto, Katano; Junji Niikura, Hirakata; Kazuhito Hatoh, Daito; Takaharu Gamo, Fujiidera, all of Japan

[73] Assignee: Matsushita Electric Industrial Co., Ltd., Osaka, Japan

[21] Appl. No.: 201,030

[22] Filed: Feb. 24, 1994

[30] Foreign Application Priority Data

Mar. 1, 1993 [JP] Japan .................. 5-039623

[51] Int. Cl.$^6$ .................. H01M 8/06
[52] U.S. Cl. .................. 429/20; 429/26
[58] Field of Search .................. 429/16, 20, 26; H01M 8/06

[56] References Cited

U.S. PATENT DOCUMENTS

| | | | |
|---|---|---|---|
| 4,647,516 | 3/1987 | Matsumura et al. | 429/19 |
| 4,877,693 | 10/1989 | Baker | 429/20 X |
| 5,100,743 | 3/1992 | Narita et al. | 429/19 |
| 5,175,062 | 12/1992 | Farooque et al. | 429/20 |
| 5,348,814 | 9/1994 | Niikura et al. | 429/20 X |

FOREIGN PATENT DOCUMENTS

| | | |
|---|---|---|
| 63-310574 | 12/1988 | Japan . |
| 02186564 | 7/1990 | Japan . |
| 4-109560 | 4/1992 | Japan . |

*Primary Examiner*—Stephen Kalafut
*Attorney, Agent, or Firm*—Stevens, Davis, Miller & Mosher

[57] ABSTRACT

A fuel cell comprises a reformer interposed between a fuel electrode and an oxidant electrode and having a preheating zone and a reforming zone in which a reforming catalyst is laid. Fuel gas introduced into the fuel is at first introduced into the preheating zone where it is preheated by heat generated during power generation.

14 Claims, 5 Drawing Sheets

FUEL CELL

BACKGROUND OF THE INVENTION

The present invention relates to a fuel cell, and in particular, to an indirect reforming type fuel cell having a reformer including a catalyst material for reforming hydrocarbonate group fuel gas and using molten carbonate.

PRIOR ART OF THE INVENTION

A high temperature fuel cell such as a molten carbonate fuel cell uses in general fuel gas containing hydrogen gas as a main component. That is, those which seem to correspond to a large scale molten carbonate fuel cell alternative for central power generation, use synthetic gas which contains hydrogen and which is obtained by reforming petroleum gas or natural gas, as fuel, and further, a relatively small scale molten carbonate fuel cell (on-site type) can use city gas containing methane as a main component and reformed by steam. In the case of the on-site type fuel cell, an internal reforming type fuel cell within which the reformation is carried out is practically hopeful in view of compactness, system efficiency and the cost, and accordingly, the development thereof has been studied.

This internal reforming type system includes two types, a direct internal reforming type and an indirect internal reform type. The direct internal reforming type one has a problem of degradation of a reforming catalyst caused by ooze-out of electrolyte or contact with electrolyte vapor since the catalyst is laid in its power generation part, although its efficiency is high. On the contrary, the indirect internal reforming type one is advantageous since the power generation part and the reforming part thereof are isolated from each other so that the use life of a catalyst can be enhanced, although the thermal efficiency thereof is lower than that of the direct internal reforming type one. However, both of them have to preheat fuel gas up to a temperature around a working temperature before the fuel gas is introduced into the reformer. Accordingly, a preheater is in general located in a fuel gas intake part for preheating fuel gas.

Japanese Laid-Open Patent Publication No. 4-109560 discloses a technology relating to an internal reforming type molten carbonate fuel cell which is sectioned into power generation zones and a reforming zone so that the fuel gas is introduced into the reforming zone where the fuel gas makes contact with a reforming catalyst after it is led through the upstream power generation zone, and then it is introduced into the downstream power generation zone in order to prevent degradation of the activity of the reforming catalyst. However, this technology disclosed in this publication does not take a measure for preheating the fuel gas. Further, U.S. Pat. No. 4,647,516 discloses a technology such that the a first reforming zone for carrying out reforming reaction and a second reforming zone for carrying out both reforming reaction and electrochemical reaction are provided so as to reduce the packing quantity of the catalyst in order to aim at miniaturizing the fuel cell. However, this technology also does not take a measure for preheating the fuel gas since no zone for preheating the fuel gas is provided.

However, the above-mentioned technology in which a preheater is used in the above-mentioned gas inlet part, requires an additional power for preheating the gas. Further, the attachment of the preheater in the gas supply system inevitably increases the manhours for assembling a fuel cell body, and further complicates the supply system while causes disadvantages in view of compactness. Further, even though the direct internal reforming type one does not require an independent reformer for carrying out reforming reaction around a fuel electrode, it is required that the fuel gas is preheated before it is introduced into the cell body.

SUMMARY OF THE INVENTION

The present invention is devised in order to solve the above-mentioned problems inherent to conventional fuel cells, and accordingly, one object of the present invention is to provide a compact fuel cell having a fuel cell body which can be simply assembled, and which does not require an additional energy for preheating fuel gas.

To the end, according to the present invention, a fuel cell comprises a fuel cell body including at least one cell element mainly composed of a fuel electrode, an oxidant electrode and an electrolyte board made of carbonate and interposed between the fuel electrode and the oxidant electrode, and a plate type reformer incorporated adjacent to the fuel cell body whereby the reformer has a zone located on the upstream side in a direction in which fuel gas flows, for preheating the fuel gas, and a reforming zone on the downstream side, in which a reforming catalyst is provided.

With this arrangement in which the reformer has the zone for naturally preheating fuel gas and the reforming zone, it is possible to eliminate the necessity of the provision of a preheater for heating the fuel gas prior to the introduction of the fuel gas into the reformer, and accordingly, the complicated attachment thereof can be eliminated. Further, no energy for preheating the fuel gas is required since heat during power generation can be used for both preheating and reforming of the fuel gas, and further, it is possible to assemble the cell body in a relatively compact form. Further, by setting a plurality of catalysts having different characteristics in the reforming zone, it is possible to aim at balancing with a heat generated from the cell, thereby the temperature distribution of the cell surface can be made to be uniform.

BRIEF DESCRIPTION OF THE DRAWINGS

These and other objects, advantages, features and uses will become more apparent as the description proceeds, when considered with the accompanying drawings in which.

DETAILED DESCRIPTION OF THE PREFERRED EMBODIMENTS

First Embodiment

Figure 1:
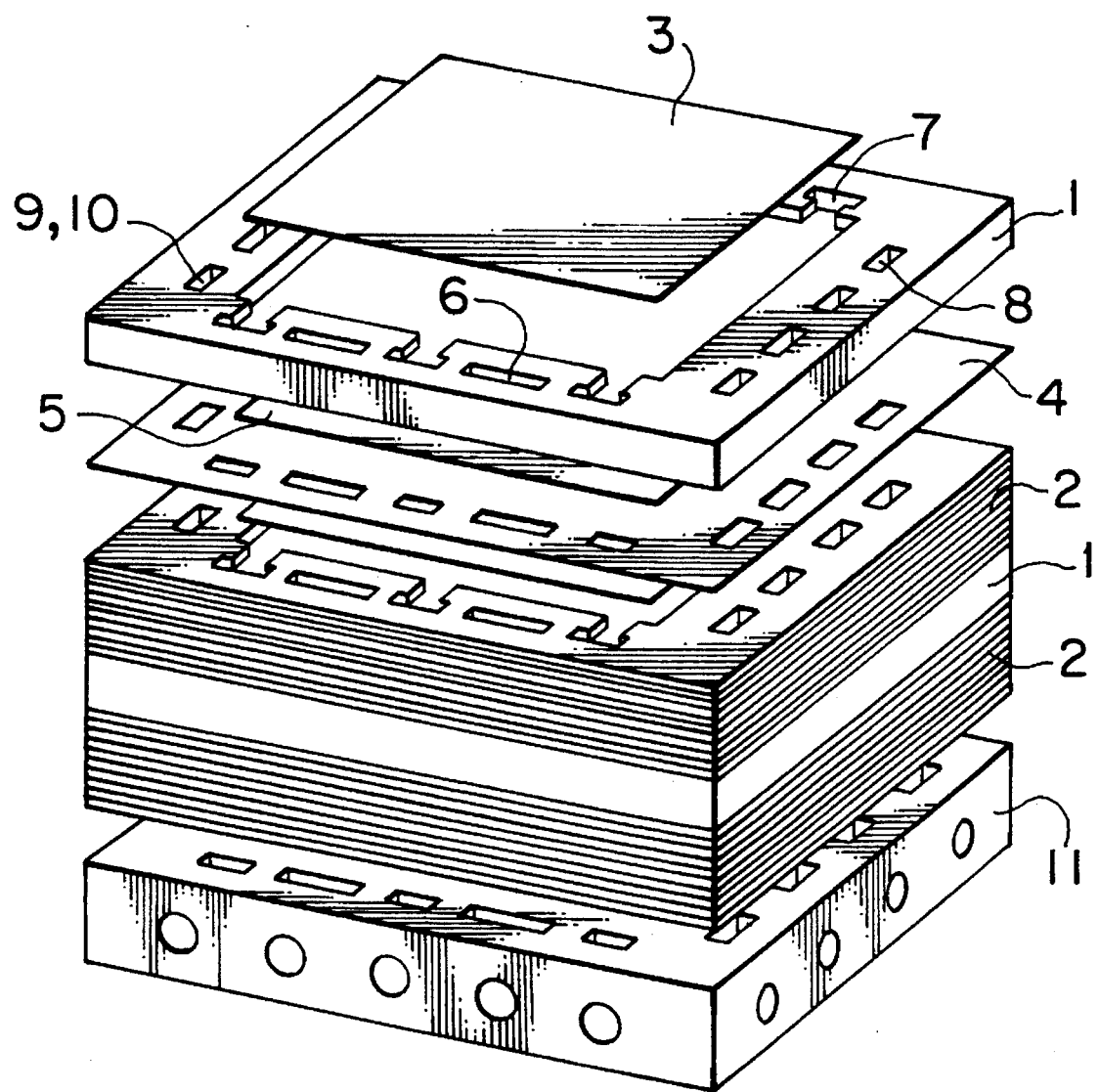
FIG. 1 is a perspective view illustrating the arrangement of a fuel cell in a first embodiment of the present invention.
Figure 2:
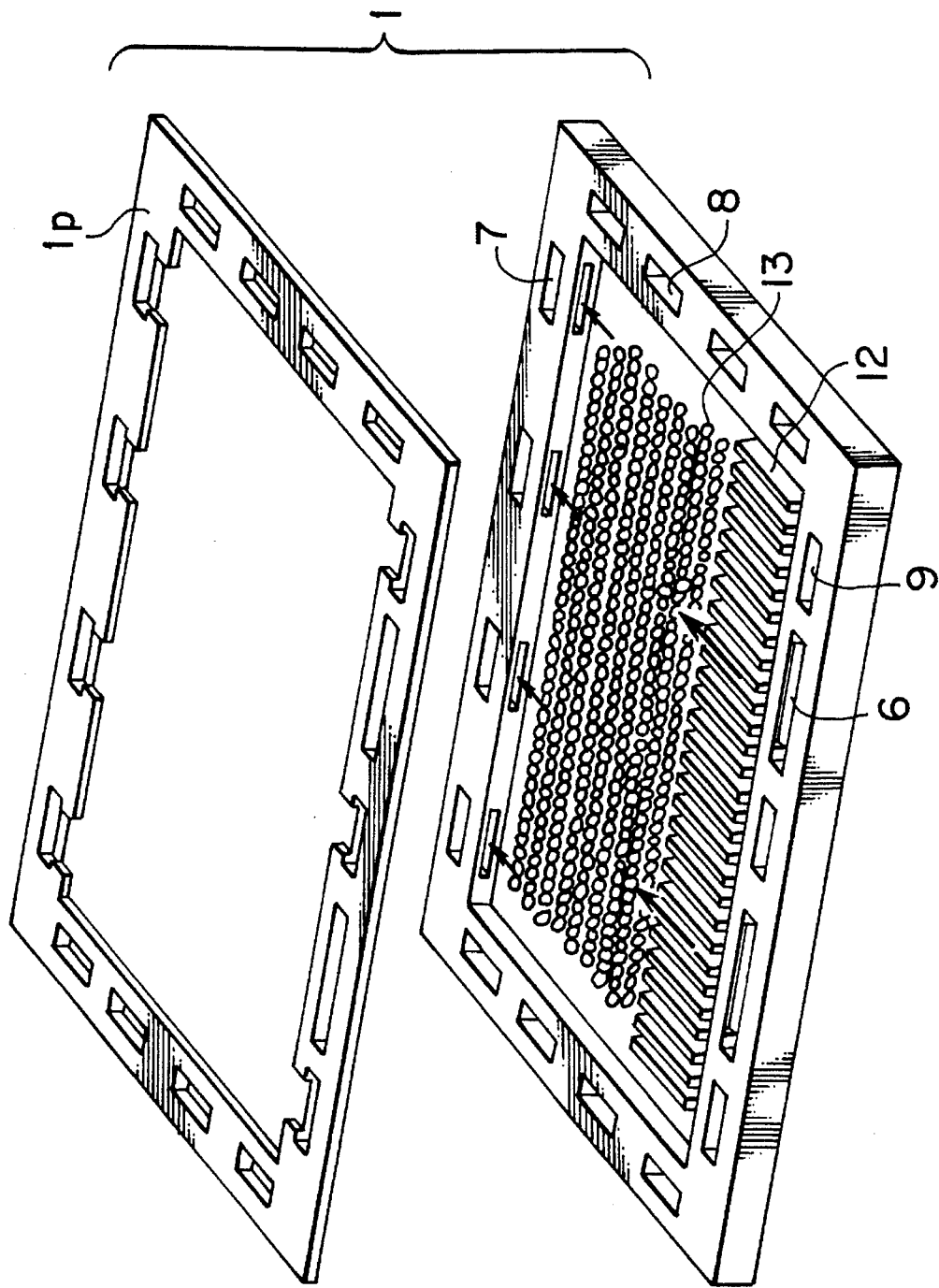
FIG. 2 is a perspective view illustrating a plate-type reformer in the first embodiment of the present invention, which is shown being partly broken.

Referring to FIGS. 1 and 2, a plate type reformer 1 having an end plate lp at its upper end, is interposed between cell elements 2, and has a shape resembling to that of a bipolar plate in the cell element 2. Accordingly, it is combined with a fuel electrode 3, an electrolyte plate 4 and an oxidant electrode 5 so as to serve as a part of the fuel cell. Further, the plate type reformer 1 and the cell elements 2 which are stacked upon another, have internal manifold holes 6 for supplying fuel gas, reformed gas manifold holes 7, oxidant gas manifold holes 8, and exhaust gas manifold holes 9, 10, which pierce through the stack. The gas is adapted to be fed to and discharged from a lower header 11. The internal manifold holes 6 for supplying fuel gas have only openings communicated with the inside of the reformer plate. The fuel gas is fed into the reformer through the openings but is not fed into the cell elements 2. The fuel gas having been fed into the reformer plate is led through a preheating zone having heat-exchange fins 12 so as to be sufficiently heated. Thereafter, the fuel gas is reformed in a zone in which reforming catalysts are laid, and are then fed into the cell elements 2 from outlet ports through fuel manifold holes 7. It is noted that the fuel electrode 3 side is set at the upper surface while the oxidant electrode 5 side is set at the lower surface in the arrangement shown in FIG. 2 when it is viewed as a bipolar plate. Further, the oxidant gas is fed into the cell elements 2 through the oxidant gas manifold holes 8, and exhaust gas is discharged from the fuel exhaust gas manifold holes 9 and the oxidant exhaust gas manifold holes 10 after reaction.

A fuel cell in which such a plate type reformer 1 is interposed between the cell elements 2 has not to have a preheater for preheating the fuel gas before the fuel gas is led into the header since the heat generated from the cell can be used for naturally preheating the fuel gas through the intermediary of the heat-exchange fins 12. Accordingly, no energy for preheating the fuel gas is required, thereby it is possible to constitute a fuel cell having a high degree of efficiency. Further, instead of the provision of the heat-exchange fins 12, substance such as alumna balls having a high degree of heat-exchange efficiency can be packed in the preheating zone of the plate type reformer 1 in order to preheat the fuel gas.

Second Embodiment

Figure 3:
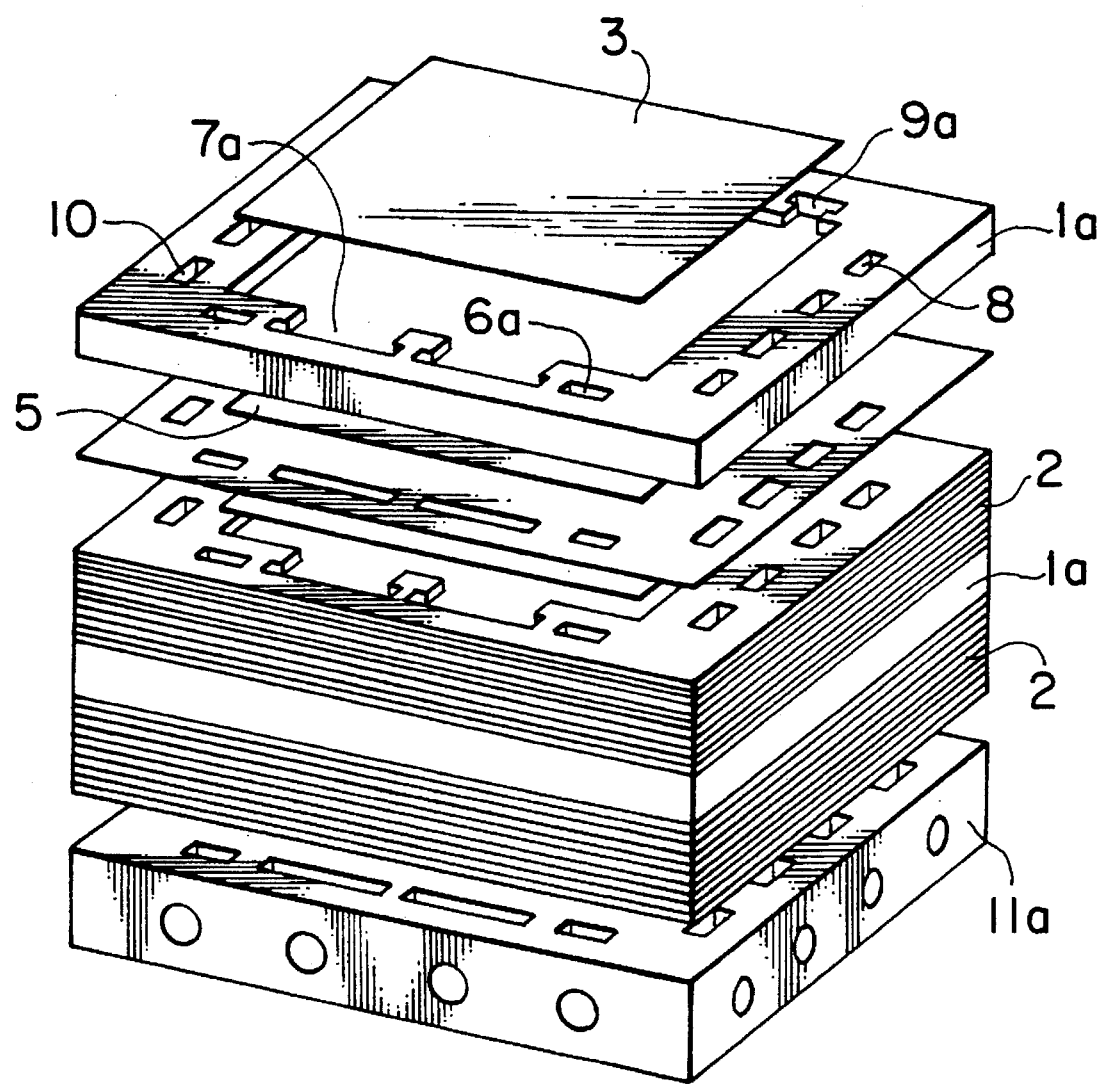
FIG. 3 is a perspective view illustrating the arrangement of a fuel cell in a second embodiment.
Figure 4:
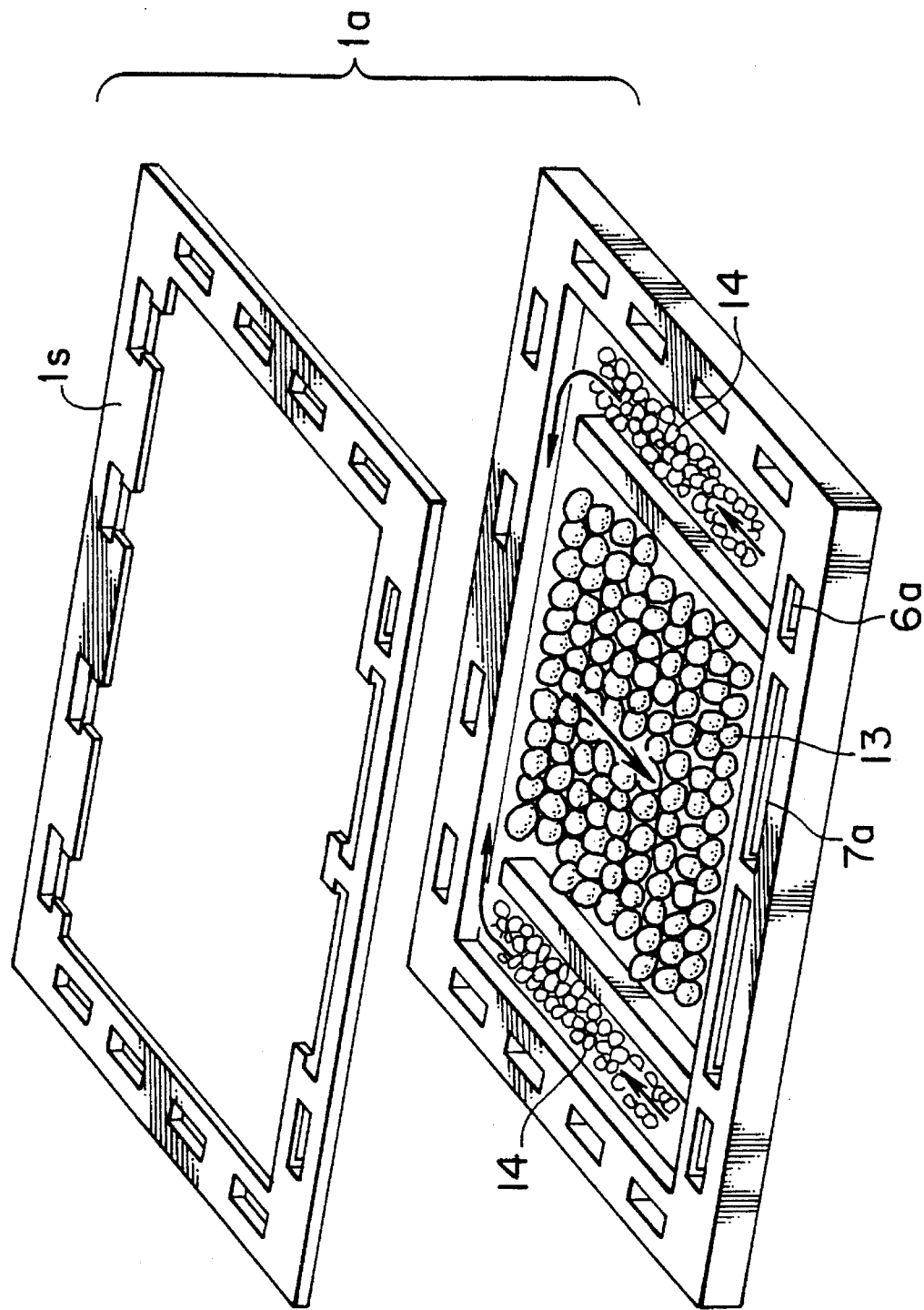
FIG. 4 is a perspective view illustrating a reformer in the second embodiment, which is shown being partly broken.

Referring to FIGS. 3 and 4, internal manifold holes and gas passages in a reformer have structures which are different from those explained in the first embodiment. That is, a plate type reformer 1a having an end plate 1s at its upper end, is interposed between cell elements 2, and resembles a bipolar plate in the cell element 2. Accordingly, it is combined with a fuel electrode 3, an electrolyte plate 4 and an oxidant electrode 5 so as to serve as a part of a cell. Further, the plate type reformer 1a and cell elements 2 which are stacked one upon another, have internal manifold holes 6a for supplying fuel gas, reformed gas manifold holes 7a, oxidant manifold holes 8 and exhaust gas manifolds 9a, 10a, which pierce through the stack. The gas is adapted to be fed to or exhausted from a lower header 11a.

The manifold holes 6a for supplying the fuel gas have only openings communicated with the inside of the plate-type reformer 1a, and accordingly, the fuel gas is fed into the reformer, but is not fed into the cell elements 2. The fuel gas 1a fed into the plate type reformer 1a is led through an outside preheating zone (heat-exchange filler 14 is packed) which is sectioned by two partition plates so that it turns in a U-like shape, and is then introduced into an inner reforming catalyst layer 13. Reformed gas produced from this catalyst layer 13 is fed into the cell elements 2 from the outlet ports by way of the reformed manifold holes 7a. It is noted that the fuel electrode 3 side is set at the upper surface while the oxidant electrode 5 side is set at the lower surface when viewed as a bipolar plate. Further, the oxidant gas is fed into the cell elements 2 from the oxidant gas manifold holes 8, and exhaust gas after reaction is discharged from the fuel exhaust gas manifold holes 9a and the oxidant exhaust gas manifold holes 10.

Figure 5:
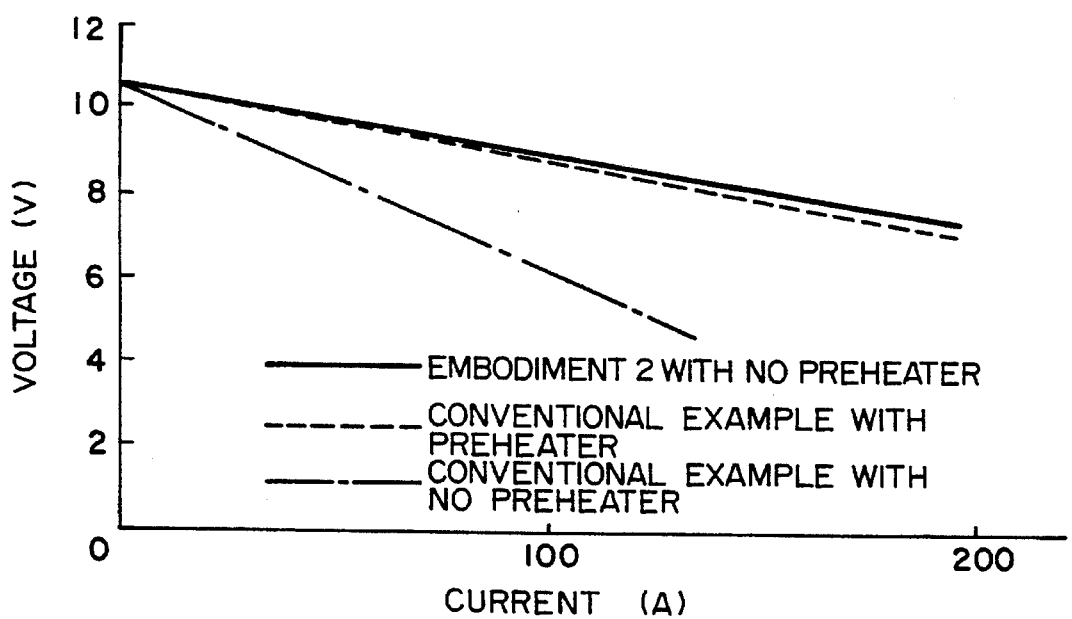
FIG. 5 is a graph showing the comparison in performance between the fuel cell in the second embodiment and a conventional cell using a preheater.

In the fuel cell in which such a plate type reformer 1a is interposed between the cell elements 2, heat generated in the fuel cell is used for naturally preheating the fuel gas through the intermediary of the heat-exchange filler 14. Accordingly, no preheater for heating the fuel gas before it is led into the header is required, and accordingly, it is possible to enhance the efficiency of the fuel cell. With the use of the above-mentioned measures, it is possible reduce the working manhours by about 20% in comparison with the conventional measures. Further, FIG. 5 shows the result of comparison among the fuel cell in the second embodiment, a conventional fuel cell using a preheater for preheating fuel gas, and a conventional fuel cell (having no preheating zone) without using a preheater. In this case, the fuel cell in the second embodiment was composed of a stack of ten cell elements having a square of 40 cm, and a reformer was located at the center of the stack. Methane gas was used as the fuel gas under a reforming condition of S/C (steam to carbon mol ratio)= 3.0. Further, in the conventional example, the fuel gas was preheated up to a temperature of 650 deg. C. by the preheater, and was then introduced into the header 11 a. From the comparison, it was found that the fuel cell in the second embodiment exhibits a fuel cell performance substantially identical with that of the conventional fuel cell using the preheater, even though no preheater is used. Further, in the case of the conventional fuel cell having no preheating zone and using no preheater, its fuel cell performance was lower than that of the fuel cell in the second embodiment. Thus, it is clearly found that the provision of the preheating zone can enhance the fuel cell performance.

As the heat-exchange filler 14 used in the second embodiment, alumina, ceramic or metal can be used in a form which may be spherical, pellet-like or any other shape suitable for the reformer in the second embodiment. Further, instead of the heat-exchange filler 14, the heat-exchange fins 12 shown in the first embodiment can be used in the preheating zone.

Third Embodiment

Figure 6:
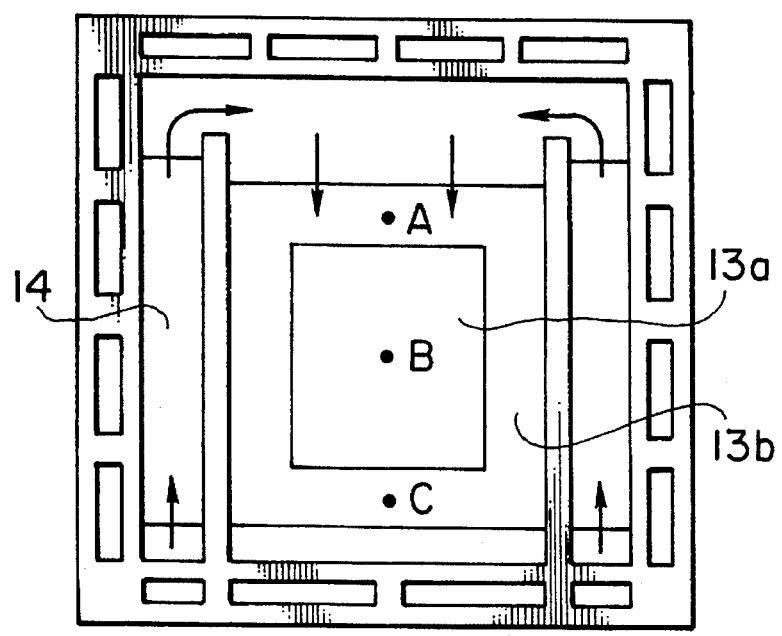
FIG. 6 is a plan view showing reforming catalysts having different characteristics in a charged condition in a third embodiment of the present invention.

Next, explanation will be made of a third embodiment having a structure similar to that of the second embodiment with reference to FIG. 6 which is a plan view schematically showing a fuel cell having a plate type reformer 1a, the fuel electrode side end plate 1p of the plate type reformer 1a being removed. By the way, if the endothermic function caused by the reforming reaction is not well-balanced with the exothermic function of the fuel cell body, a local temperature rise or drop occurs in the cell elements so as to cause lowering of the fuel cell performance. In general, the temperature of the central part of each of the cell elements tends to become higher than that of the peripheral part of the cell element. In the case of a large size stack, although a part of the inside of the cell element, which is heated up differs depending upon a direction of supply of fuel gas or oxidant gas, it also has a tendency such that the temperature of the center part thereof becomes higher than that of the peripheral part. In particular, in the case of a relative small scale stack used for an on-site power generation, the influence of heat radiation from the stack side surfaces becomes larger, and accordingly, the above-mentioned tendency is remarkable. Accordingly, a catalyst 13a having a high reforming performance is packed in the center part of its reforming zone of the plate type reformer 1a while a low catalyst 13b having a low reforming performance is packed in the peripheral part of the reforming zone in order to effectively suppress the local temperature rise of the center part of the cell element, and accordingly, it is possible to restrain the fuel cell performance from deteriorating. Table 1 shows the temperatures of a cell at positions just above points A, B, C (refer to FIG. 6) in the reforming zone with the use of the fuel cell in the second embodiment, in the case of packing the same catalyst in the entire reforming zone and in the case of packing two kinds of reforming catalysts having different reforming catalysts, respectively.

TABLE 1

|   | EMBODIMENT 2 (deg. C.) | EMBODIMENT 3 (deg. C.) |
|---|---|---|
| A | 635 | 643 |
| B | 660 | 648 |
| C | 645 | 644 |

Thus, the temperature distribution of the fuel cell in the third embodiment can be made to be uniform in the gas flowing direction, in comparison with the fuel cell in the second embodiment in which a single kind of catalyst is charged in the entire cell element. Further, in addition to the above-mentioned packing of the catalysts, if the temperature distribution becomes inuniform caused by a structure of a stack, a supply direction of fuel gas or an oxidant gas, a plurality of catalysts having a suitable mixture ratio is packed in the plate-type reformer so as to make the temperature distribution uniform. Thus, it is possible to provide a fuel cell which can eliminate the necessity of preheating of fuel gas and which can control the temperature distribution in the fuel cell surface.

As mentioned above, according to the present invention, it is possible to provide a simple and efficient fuel cell in which a plate type reformer incorporates a preheating zone and a reforming zone for fuel gas so that no preheating is required before the fuel gas is introduced into the reformer.

What is claimed is:

1. A fuel cell comprising a cell body having at least one cell element mainly composed of a fuel electrode and an oxidant electrode and an electrolyte board interposed between said fuel electrode and said oxidant electrode, and a plate-type reformer incorporated adjacent to said cell body, said reformer having a zone for preheating fuel gas and a reforming zone in which a reforming catalyst is located, said preheating zone being located upstream of said reforming zone in a direction in which said fuel gas flows, and including fins for radiating heat transmitted from said fuel cell so as to preheat said fuel gas.

2. A fuel cell comprising a cell body having at least one cell element mainly composed of a fuel electrode and an oxidant electrode, and an electrolyte board interposed between said fuel electrode and said oxidant electrode, and a plate-type reformer incorporated adjacent to said cell body, said reformer having a preheating zone and a reforming zone in which a reforming catalyst is located, and said preheating zone being located upstream of said reforming zone and including a heat-exchanging filler for transmitting heat from said cell element so as to heat said fuel gas.

3. A fuel cell as set forth in claim 1, wherein said reformer has a center part in which said reforming zone is provided, and said preheating zone surrounds said reforming zone.

4. A fuel cell as set forth in claim 1, wherein said reforming zone comprises a reforming catalyst composed of a first catalyst and a second catalyst having a higher reforming performance, than the first catalyst said first catalyst being located upstream of said second catalyst.

5. A fuel cell as set forth in claim 1, wherein said reforming catalyst is composed of a first catalyst and a second catalyst having a higher reforming performance, than the first catalyst said reforming zone has a center part in which said second catalyst is located, and around which said first catalyst is located.

6. A fuel cell as set forth in claim 2, wherein said reformer has a center part in which said reforming zone is provided, and said preheating zone surrounds said reforming zone.

7. A fuel cell as set forth in claim 2, wherein said reforming zone comprises a reforming catalyst composed of a first catalyst and a second catalyst having a higher reforming performance, than the first catalyst said first catalyst being located upstream of said second catalyst.

8. A fuel cell as set forth in claim 2, wherein said reforming catalyst is composed of a first catalyst and a second catalyst having a higher reforming performance, than the first catalyst said reforming zone has a center part in which said second catalyst is located, and around which said first catalyst is located.

9. A fuel cell as set forth in claim 1, wherein said preheating zone comprises two portions and said reforming zone is located between said two portions.

10. A fuel cell as set forth in claim 9, wherein said portions are discontinuous.

11. A fuel cell as set forth in claim 2, wherein said preheating zone comprises two portions and said reforming zone is located between said two portions.

12. A fuel cell as set forth in claim 11, wherein said portions are discontinuous.

13. A fuel cell as set forth in claim 1, wherein said reforming zone comprises a reforming catalyst composed of a first catalyst and a second catalyst having a higher reforming performance than the first catalyst at least a portion of said first catalyst being located upstream of said second catalyst.

14. A fuel cell as set forth in claim 2, wherein said reforming zone comprises a reforming catalyst composed of a first catalyst and a second catalyst having a higher reforming performance, than the first catalyst at least a portion of said first catalyst being located upstream of said second catalyst.

* * * * *